US007881742B2

(12) United States Patent
Gholmieh et al.

(10) Patent No.: US 7,881,742 B2
(45) Date of Patent: Feb. 1, 2011

(54) METHOD AND APPARATUS FOR POWER CONTROL DURING DTX OPERATION

(75) Inventors: Aziz Gholmieh, San Diego, CA (US); Juan Montojo, San Diego, CA (US); Stein Arne Lundby, Solana Beach, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 555 days.

(21) Appl. No.: 12/022,370

(22) Filed: Jan. 30, 2008

(65) Prior Publication Data

US 2008/0207247 A1 Aug. 28, 2008

Related U.S. Application Data

(60) Provisional application No. 60/887,551, filed on Jan. 31, 2007.

(51) Int. Cl.
*H04B 7/00* (2006.01)
(52) U.S. Cl. ............. 455/522; 455/127.1; 455/442; 370/318; 370/252
(58) Field of Classification Search ............ 455/127.1, 455/422.1, 452.2, 522, 436, 450, 452.1, 67.11, 455/442; 370/329, 311, 252, 320, 331, 332, 370/335, 342, 318, 334, 437
See application file for complete search history.

(56) References Cited

U.S. PATENT DOCUMENTS

| 7,254,413 B2 * | 8/2007 | Muller et al. | 455/522 |
| 7,340,268 B2 * | 3/2008 | Oh et al. | 455/522 |
| 7,570,967 B2 * | 8/2009 | Ronkainen | 455/522 |
| 7,711,385 B2 * | 5/2010 | Ostman et al. | 455/522 |
| 2005/0124373 A1 | 6/2005 | Marinier | |
| 2005/0141540 A1 * | 6/2005 | Li et al. | 370/437 |
| 2010/0113004 A1 * | 5/2010 | Cave et al. | 455/422.1 |

FOREIGN PATENT DOCUMENTS

| WO | 03032521 | 4/2003 |
| WO | 2007025137 | 3/2007 |

OTHER PUBLICATIONS

International Search Report—PCT/US2008/052710, International Search Authority—European Patent Office—Aug. 25, 2008.
Written Opinion—PCT/US2008/052710, International Search Authority—European Patent Office—Aug. 25, 2008.

* cited by examiner

*Primary Examiner*—Sujatha Sharma
(74) *Attorney, Agent, or Firm*—D. Scott Janeau (57) ABSTRACT

Techniques for performing power control during discontinuous transmission (DTX) operation are described. A UE transmits on the uplink during a transmission burst and receives TPC commands generated by a Node B based on the uplink transmission. The UE may receive two TPC commands at the end of the transmission burst that are not applied during the transmission burst. The UE saves and applies these two TPC commands in the next transmission burst. In one design, the UE applies each saved TPC command in one slot of the next transmission burst. In another design, the UE combines the two saved TPC commands and applies the combined value in the first two slots of the next transmission burst. In yet another design, the UE selects one of the saved TPC commands and applies the selected TPC command in the first two slots of the next transmission burst.

32 Claims, 10 Drawing Sheets

METHOD AND APPARATUS FOR POWER CONTROL DURING DTX OPERATION

CLAIM OF PRIORITY UNDER 35 U.S.C. §119

The present application for patent claims priority to Provisional U.S. Application Ser. No. 60/887,551, entitled "POWER CONTROL AND DTX-DRX," filed Jan. 31, 2007, assigned to the assignee hereof, and expressly incorporated herein by reference.

BACKGROUND

I. Field

The present disclosure relates generally to communication, and more specifically to techniques for performing power control in a wireless communication system.

II. Background

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, multiple user equipments (UEs) may transmit on the uplink to a Node B. To improve system capacity, the transmit power of each UE may be controlled such that the desired performance can be achieved for the UE while reducing the amount of interference to other UEs. For uplink power control, the Node B may periodically estimate the received signal quality of a UE at the Node B and may send transmit power control (TPC) commands to direct the UE to adjust its transmit power either up or down to achieve the desired received signal quality. The UE may adjust its transmit power in accordance with the TPC commands. However, the UE may operate in a discontinuous transmission (DTX) mode and may transmit in bursts instead of continuously. It is desirable to effectively perform power control during DTX operation.

SUMMARY

Techniques for performing power control during DTX operation are described herein. A UE may transmit on the uplink during a transmission burst and may receive TPC commands generated by a Node B based on the uplink transmission. There is typically a delay from the time that a TPC command is received at the UE to the time that the TPC command can be applied by the UE. The amount of delay may be variable and dependent on a time offset assigned to the UE for a physical channel used to send the TPC commands, as described below. The UE may receive one or two TPC commands at the end of the transmission burst that are not applied directly during the transmission burst. The UE may save the unapplied TPC command(s) and may thereafter apply the saved TPC command(s) for the next transmission burst.

The UE may apply two saved TPC commands in various manners. In one design, the UE may apply the two saved TPC commands in the first two slots of the next transmission burst. The UE may adjust its transmit power for the first slot of the next transmission burst based on one of the saved TPC commands and may adjust its transmit power for the second slot of the next transmission burst based on the other saved TPC command. In another design, the UE may combine the two saved TPC commands to obtain a combined value and may adjust its transmit power for the first two slots of the next transmission burst based on the combined value. In yet another design, the UE may limit or cap the combined value to within a predetermined range and may adjust its transmit power for the first two slots of the next transmission burst based on the capped value. In yet another design, the UE may select one of the saved TPC commands (e.g., the last TPC command or the more reliable TPC command) and may adjust its transmit power for the first two slots of the next transmission burst based on the selected TPC command. The UE may also adjust its transmit power for the next transmission burst based on the saved TPC commands in other manners.

Various aspects and features of the disclosure are described in further detail below.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and other CDMA variants. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.20, IEEE 802.16 (WiMAX), 802.11 (WiFi), Flash-OFDM®, etc. UTRA and E-UTRA are part of Universal Mobile Telecommunication System (UMTS). 3GPP Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). These various radio technologies and standards are known in the art. For clarity, certain aspects of the techniques are described below for UMTS, and 3GPP terminology is used in much of the description below.

Figure 1:
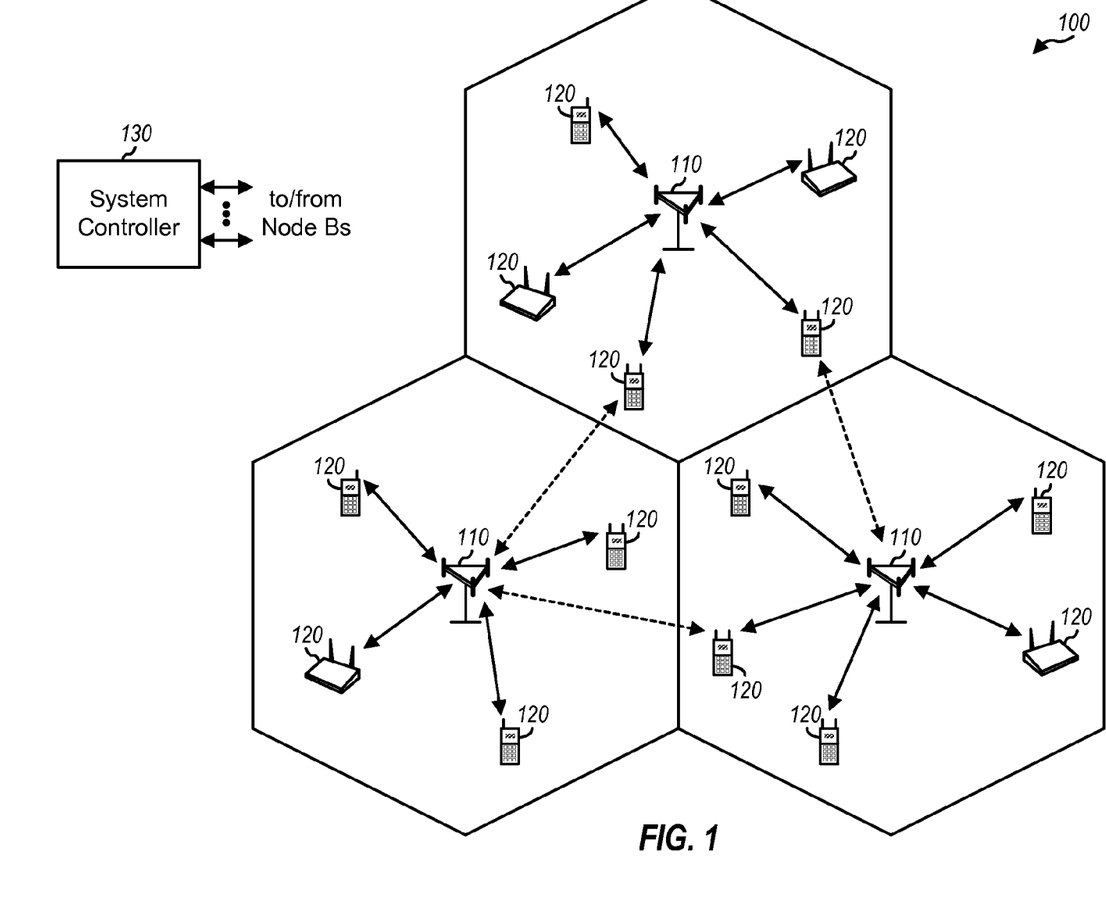
FIG. 1 shows a wireless communication system.

FIG. 1 shows a wireless communication system 100, which may also be referred to as a Universal Terrestrial Radio Access Network (UTRAN) in UMTS. System 100 includes multiple Node Bs 110. A Node B is a fixed station that communicates with the UEs and may also be referred to as an evolved Node B (eNB), a base station, an access point, etc. Each Node B 110 provides communication coverage for a particular geographic area and supports communication for the UEs located within the coverage area. A system controller 130 may couple to Node Bs 110 and provide coordination and control for these Node Bs. System controller 130 may be a single network entity or a collection of network entities.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, etc. A UE may communicate with a Node B via transmissions on the downlink and uplink. The downlink (or forward link) refers to the communication link from the Node Bs to the UEs, and the uplink (or reverse link) refers to the communication link from the UEs to the Node Bs.

UMTS uses various physical channels to send data and signaling/control information on the downlink and uplink. The physical channels are channelized with different channelization codes and are orthogonal to one another in the code domain.

Figure 2:
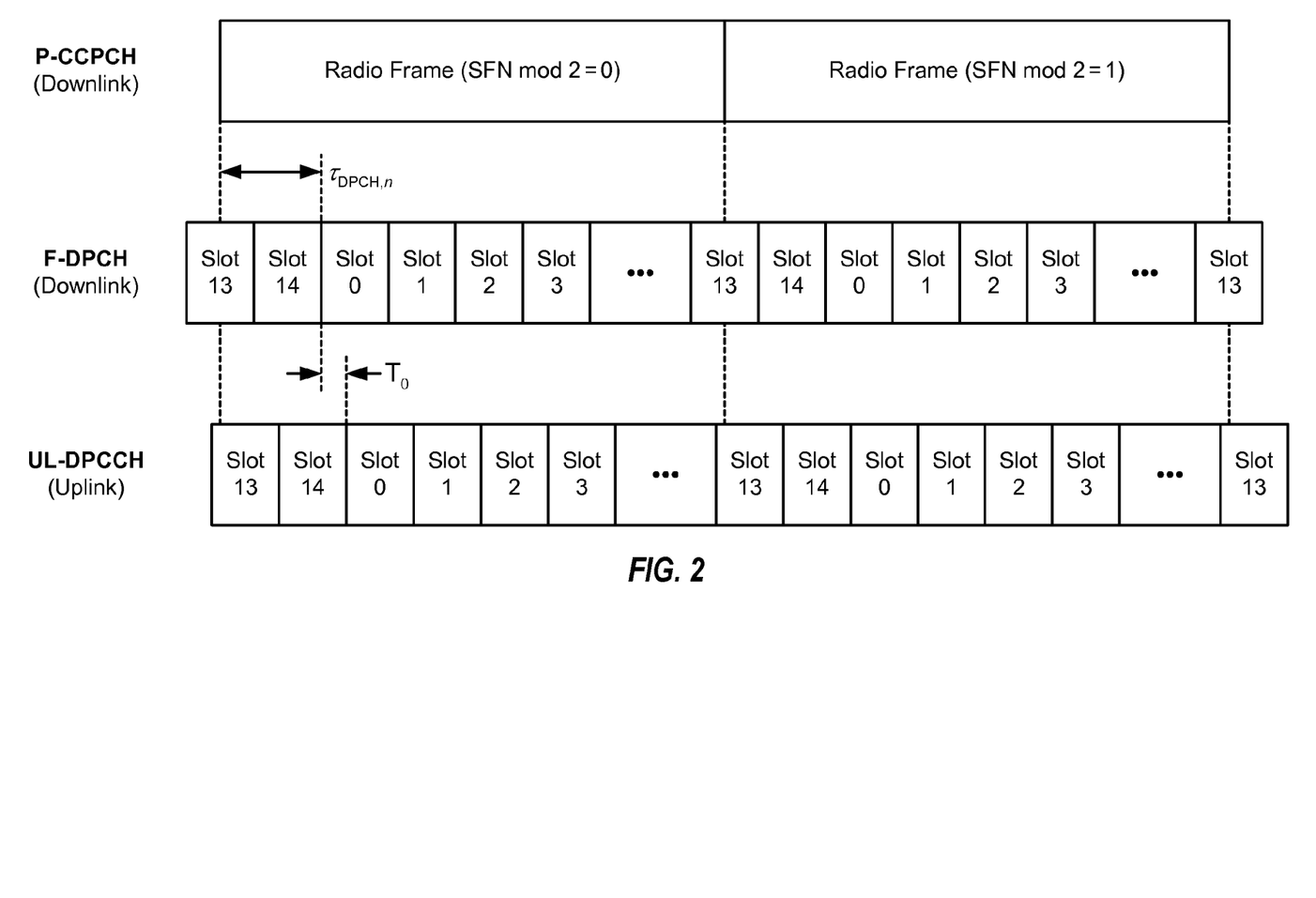
FIG. 2 shows a timing diagram of some physical channels.

FIG. 2 shows a timing diagram of some of the physical channels used in UMTS. The timeline for transmission is divided into radio frames. Each radio frame has a duration of 10 milliseconds (ms) and is identified by a 12-bit system frame number (SFN). Each radio frame is partitioned into 15 slots, which are labeled as slot 0 through slot 14. Each slot has a duration of $T_{slot}$=0.667 ms and includes 2560 chips at 3.84 Mcps. Each radio frame is also partitioned into five subframes (not shown in FIG. 2). Each subframe has a duration of 2 ms and includes 3 slots.

A Primary Common Control Physical Channel (P-CCPCH) is transmitted by a Node B on the downlink. The P-CCPCH is used directly as timing reference for downlink physical channels, and is used indirectly as timing reference for uplink physical channels. A Fractional Dedicated Physical Channel (F-DPCH) is sent on the downlink and may carry TPC commands for multiple UEs. The F-DPCH is delayed by $\tau_{DPCH,n}$ chips from the frame boundary of the P-CCPCH, where $\tau_{DPCH,n}$=256 n and n can range from 0 to 149. An uplink Dedicated Physical Control Channel (UL-DPCCH) is sent on the uplink and may carry pilot and control information from a UE. The UL-DPCCH is delayed by $T_0$=1024 chips from the frame boundary of the F-DPCH.

3GPP Release 5 and later supports High-Speed Downlink Packet Access (HSDPA). 3GPP Release 6 and later supports High-Speed Uplink Packet Access (HSUPA). HSDPA and HSUPA are sets of channels and procedures that enable high-speed packet data transmission on the downlink and uplink, respectively. Table 1 lists some physical channels used for HSDPA and HSUPA in 3GPP Release 6.

TABLE 1

| | Channel | Channel Name | Description |
|---|---|---|---|
| HSDPA | HS-SCCH (Downlink) | Shared Control Channel for HS-DSCH | Carry signaling for packets sent on the HS-PDSCH |
| | HS-PDSCH (Downlink) | High Speed Physical Downlink Shared Channel | Carry packets sent on the downlink for different UEs |
| | HS-DPCCH (Uplink) | Dedicated Physical Control Channel for HS-DSCH | Carry ACK/NACK for packets sent on the HS-PDSCH and CQI |
| HSUPA | E-DPCCH (Uplink) | E-DCH Dedicated Physical Control Channel | Carry signaling for the E-DPDCH |
| | E-DPDCH (Uplink) | E-DCH Dedicated Physical Data Channel | Carry packets sent on the uplink by a UE |
| | E-HICH (Downlink) | E-DCH Hybrid ARQ Indicator Channel | Carry ACK/NACK for packets sent on the E-DPDCH |

3GPP Release 7 supports Continuous Packet Connectivity (CPC), which allows a UE to operate with DTX and/or discontinuous reception (DRX) in order to conserve battery power. For DTX, the UE may be assigned certain enabled uplink subframes in which the UE can send uplink transmission to a Node B. The enabled uplink subframes may be defined by an uplink DPCCH burst pattern. For DRX, the UE may be assigned certain enabled downlink subframes in which the Node B can send downlink transmission to the UE. The enabled downlink subframes may be defined by an HS-SCCH reception pattern. The UE may send signaling and/or data in the enabled uplink subframes and may receive signaling and/or data in the enabled downlink subframes. The UE may power down during the idle times between the enabled subframes to conserve battery power. CPC is described in 3GPP TR 25.903, entitled "Continuous Connectivity for Packet Data Users," March 2007, which is publicly available.

Figure 3:
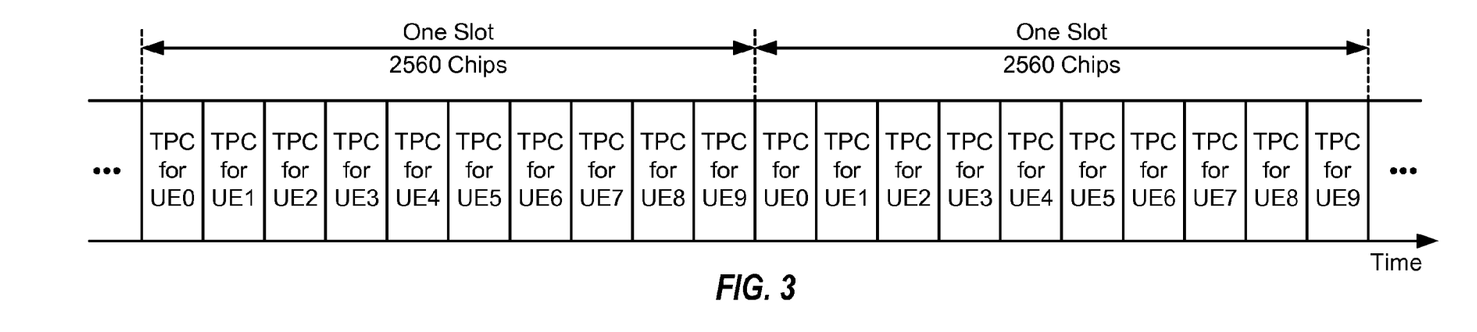
FIG. 3 shows transmission of TPC commands by a Node B.

FIG. 3 shows transmission of TPC commands on the F-DPCH by a Node B. The Node B may send up to ten TPC commands for up to ten UEs on the F-DPCH in each slot. These UEs may be multiplexed in time on the F-DPCH, and each UE may have a different time offset for the F-DPCH. As shown in FIG. 3, the Node B may send the TPC commands for UE 0 in the first position of each slot, the TPC commands for UE 1 in the second position of each slot, and so on, and the TPC commands for UE 9 in the last position of each slot. The Node B may send a new TPC command to a given UE on the F-DPCH in each slot at the assigned time offset.

Figure 4:
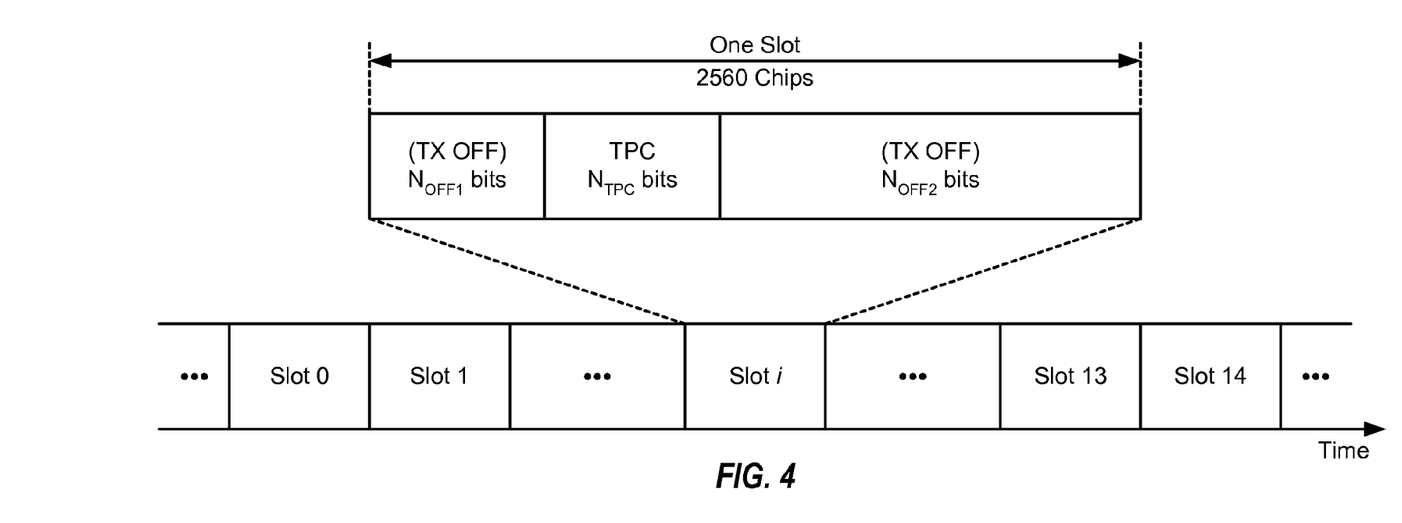
FIG. 4 shows reception of TPC commands by a UE.

FIG. 4 shows reception of TPC commands on the F-DPCH by a UE. The UE may receive a TPC command on the F-DPCH in each slot. The TPC command for the UE is sent using $N_{TPC}$ bits that start $N_{OFF1}$ bits from the start of the slot. Ten slot formats 0 through 9 are supported for the F-DPCH and correspond to 10 different time offsets shown in FIG. 3. $N_{OFF1}$ is equal to 0 through 2304 chips for slot formats 0 through 9. In each slot, the UE may ignore the first $N_{OFF1}$ bits on the F-DPCH, process the next $N_{TPC}$ bits to receive its TPC command, and ignore the last $N_{OFF2}$ bits. From the UE perspective, the TPC command may have any time offset in the F-DPCH slot.

Figure 5:
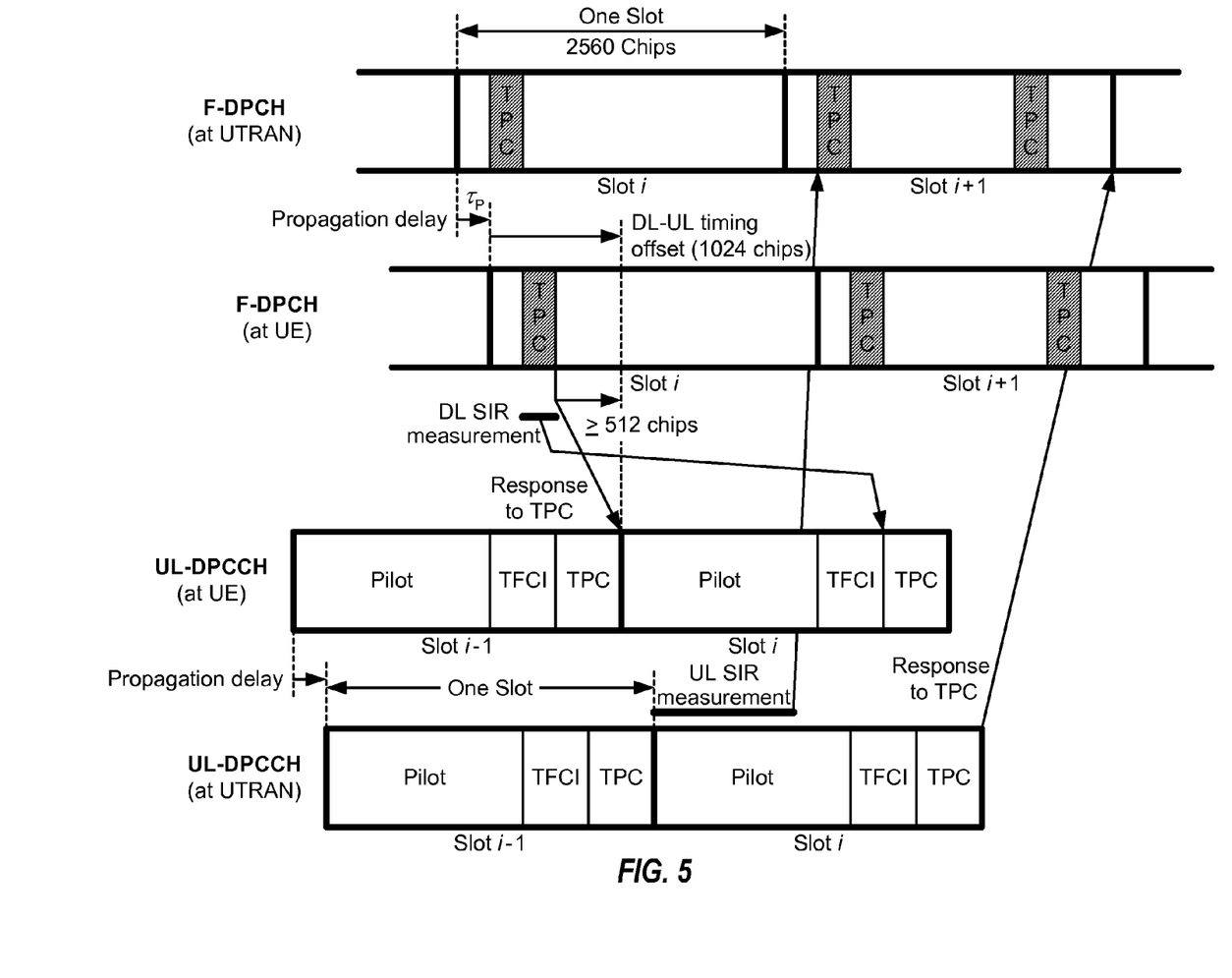
FIG. 5 shows uplink power control for the UE with early TPC commands.

FIG. 5 shows an example of uplink power control for a UE with early TPC commands. A Node B may send a TPC command to the UE on the F-DPCH in each slot at a time offset assigned to the UE. The TPC command may thus be located anywhere within the slot depending on the assigned time offset. In the example shown in FIG. 5, the assigned time offset is near the start of the slot on the F-DPCH. The UE may receive the F-DPCH after a propagation delay of $\tau_P$.

The UL-DPCCH is delayed by 1024 chips from the slot boundary of the F-DPCH. The amount of time between a received TPC command and the start of the slot on the UL-DPCCH is dependent on the F-DPCH time offset assigned to the UE. If there is at least 512 chips between the TPC command received on the F-DPCH in slot i and the start of slot i on the UL-DPCCH, as shown in FIG. 5, then the current timing relationship holds. In this case, the UE may apply the TPC command received on the F-DPCH in slot i at the same slot i on the UL-DPCCH. In particular, the UE may respond to the received TPC command by adjusting the transmit power of the UL-DPCCH in slot i based on the received TPC command. Furthermore, the UE may estimate the signal-to-noise-and-interference ratio (SIR) of the downlink based on the received TPC command. The UE may then generate a TPC command for the Node B based on the downlink SIR estimate and send this TPC command on the UL-DPCCH in slot i, as shown in FIG. 5.

The Node B may receive the UL-DPCCH from the UE after a propagation delay. The Node B may estimate the SIR of the uplink for the UE based on the pilot received on the UL-DPCCH in slot i. The Node B may then generate a TPC command for the UE based on the uplink SIR estimate and send this TPC command on the F-DPCH at the assigned time offset in slot i+1. The Node B may also respond to the TPC command received on the UL-DPCCH in slot i by adjusting the transmit power of the F-DPCH in slot i+2 based on this received TPC command.

In the example shown in FIG. 5, the uplink power control loop is closed in one slot. The TPC command sent by the Node B on the F-DPCH in slot i is applied by the UE to the pilot sent on the UL-DPCCH in slot i. This pilot is used to generate the TPC command sent by the Node B on the F-DPCH in slot i+1.

Figure 6:
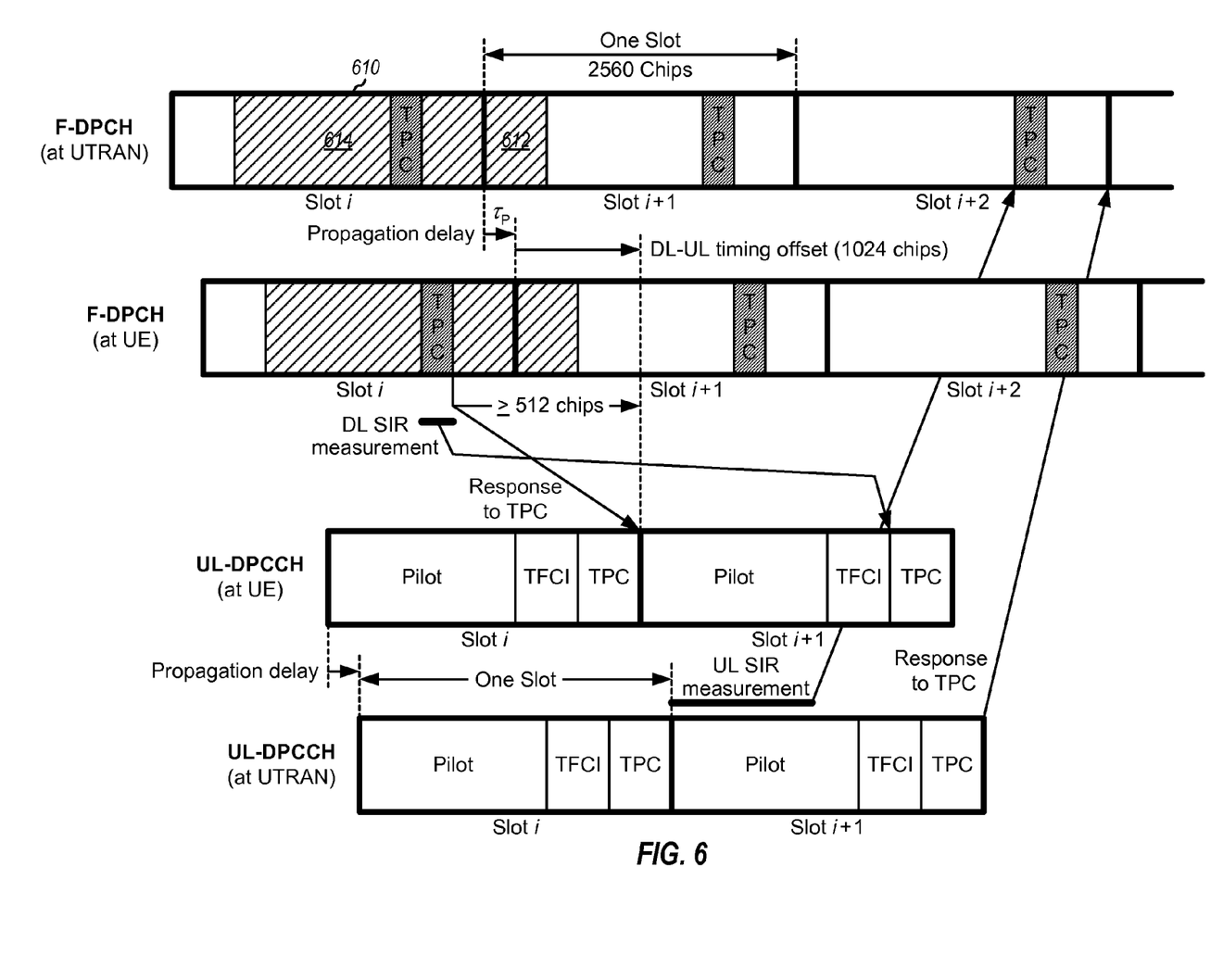
FIG. 6 shows uplink power control for the UE with late TPC commands.

FIG. 6 shows an example of uplink power control for the UE with late TPC commands. In this example, the assigned time offset for the UE is near the end of the slot on the F-DPCH. The UE receives a TPC command on the F-DPCH in slot i at the assigned time offset. In this example, the TPC command received on the F-DPCH in slot i is not at least 512 chips prior to the start of slot i on the UL-DPCCH, as shown in FIG. 6. In this case, the UE may apply the TPC command received on the F-DPCH in slot i at the next slot i+1 on the UL-DPCCH. In particular, the UE may respond to the received TPC command by adjusting the transmit power of the UL-DPCCH in slot i+1 based on the received TPC command. The UE may also estimate the downlink SIR based on the received TPC command, generate a TPC command based on the downlink SIR estimate, and send this TPC command on the UL-DPCCH in slot i+1, as shown in FIG. 6.

The Node B may receive the UL-DPCCH from the UE, estimate the uplink SIR for the UE based on the pilot received on the UL-DPCCH in slot i+1, generate a TPC command based on the uplink SIR estimate, and send this TPC command on the F-DPCH at the assigned time offset in slot i+2. The Node B may also respond to the TPC command received on the UL-DPCCH in slot i+1 by adjusting the transmit power of the F-DPCH in slot i+3 based on this received TPC command.

In the example shown in FIG. 6, the uplink power control loop is closed in two slots. The TPC command sent by the Node B on the F-DPCH in slot i is applied by the UE to the pilot sent on the UL-DPCCH in slot i+1. This pilot is used to generate the TPC command sent by the Node B on the F-DPCH in slot i+2.

FIGS. 5 and 6 show examples of uplink power control with early and late TPC commands, respectively. As shown in FIG. 6, a TPC command received anywhere within shaded area 610 may be applied to the UL-DPCCH in slot i+. If the TPC command is located within an area 612, which is the portion of shaded area 610 belonging to slot i+1 of the F-DPCH, then the TPC command is applied in the same slot i+1 of the UL-DPCCH. If the TPC command is located within an area 614, which is the portion of shaded area 610 belonging to slot i of the F-DPCH, then the TPC command is applied in the next slot i+1 of the UL-DPCCH. Early TPC commands are TPC commands received within area 612 and can be applied to the UL-DPCCH in the same slot. Late TPC commands are TPC commands received within area 614 and can be applied to the UL-DPCCH in the next slot.

Figure 7:
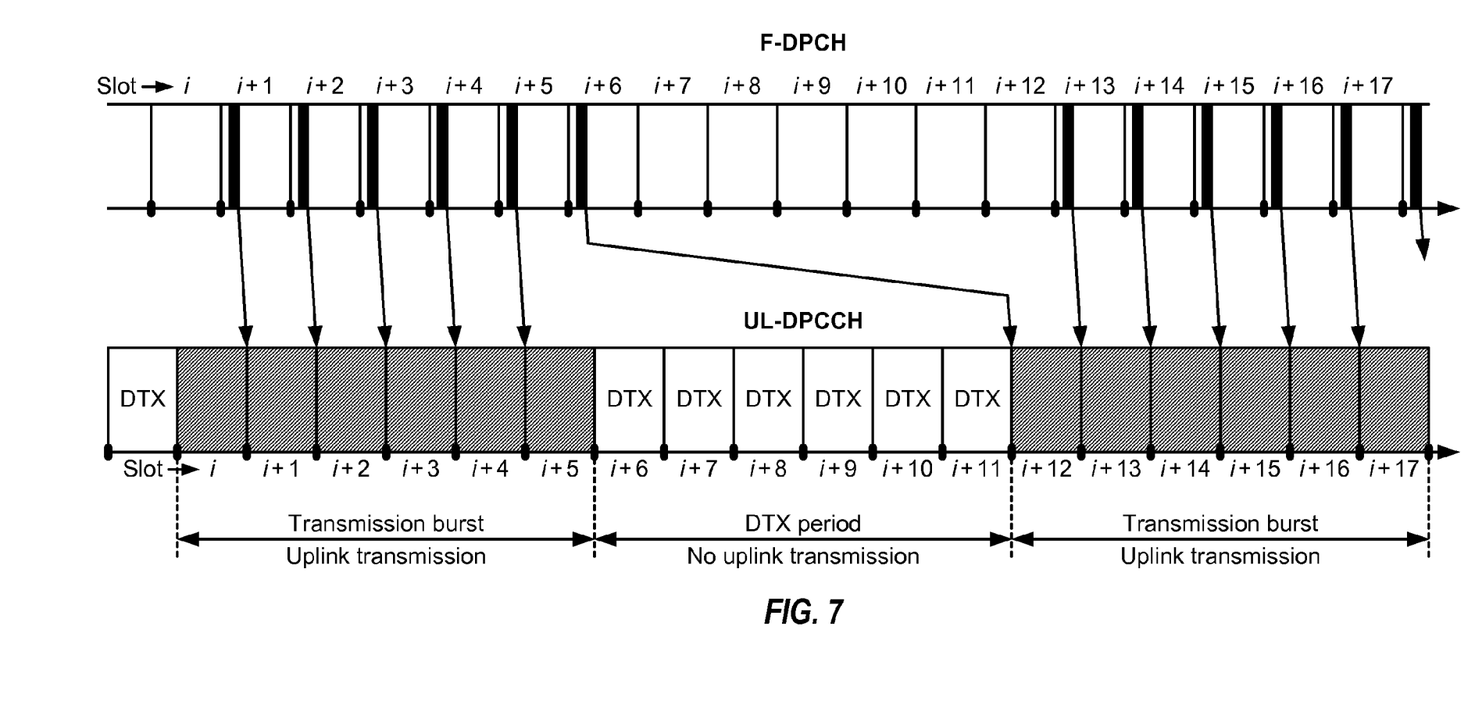
FIG. 7 shows uplink power control for the UE during DTX operation with early TPC commands.

FIG. 7 shows an example of uplink power control for the UE during DTX operation with early TPC commands. In this example, the UE transmits on the UL-DPCCH for six slots i through i+5, then does not transmit on the uplink for the next six slots i+6 through i+11, then transmits on the UL-DPCCH for the next six slots i+12 through i+17, etc. In general, the number of enabled uplink slots in which the UE transmits on the UL-DPCCH (which is 6 in the example shown in FIG. 7) may be configurable. The time interval between consecutive bursts of enabled uplink slots (which is 12 slots in the example shown in FIG. 7) may also be configurable.

In the example shown in FIG. 7, the TPC commands for the UE are sent on the F-DPCH near the start of each slot and are at least 512 chips prior to the start of the same slot on UL-DPCCH, as shown in FIG. 5. The UE may thus apply the TPC command received on the F-DPCH in slot i+1 to the uplink transmission on the UL-DPCCH in the same slot i+1. The pilot sent on the UL-DPCCH in slot i+5 is used to generate the TPC command sent on the F-DPCH in slot i+6. However, since the UE does not transmit on the uplink in slot i+6, the UE may save the TPC command received on the F-DPCH in slot i+6. The UE may apply this saved TPC command to the uplink transmission on the UL-DPCCH in slot i+12 upon resuming transmission.

In the example shown in FIG. 7, there is one TPC command at the end of each transmission burst that is not directly applied in that transmission burst. This TPC command may be saved and applied to the first slot of the next transmission burst.

When a TPC command received on the F-DPCH in slot i is applied to the UL-DPCCH in slot i+1, as shown in FIG. 6, the extra delay may result in two TPC commands at the end of a transmission burst that are not directly applied in that transmission burst. It may be desirable to utilize both of these TPC commands for the next transmission burst.

Figure 8A:
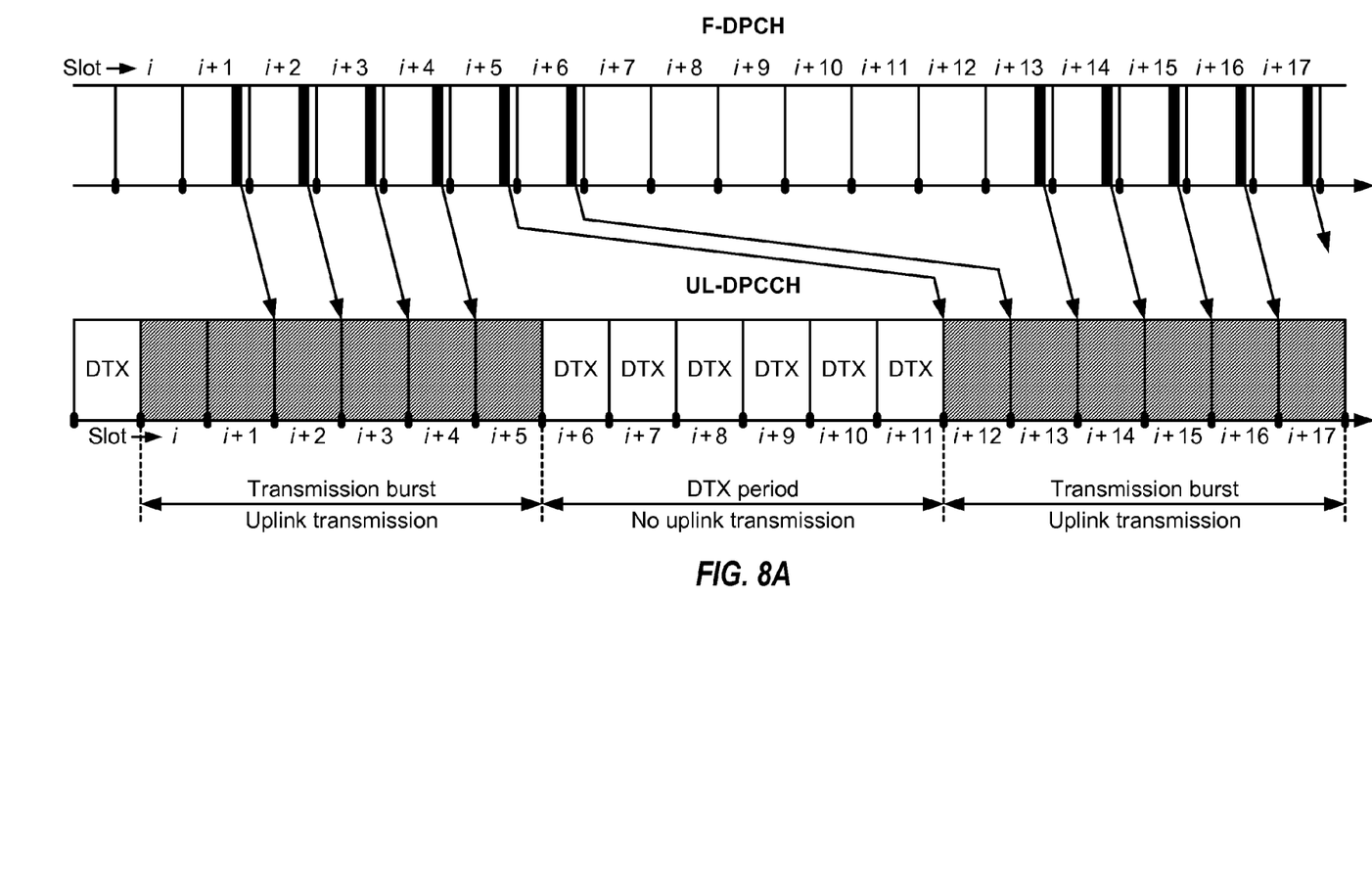
FIGS. 8A and 8B show two designs of uplink power control for the UE during DTX operation with late TPC commands.

FIG. 8A shows a design of uplink power control for the UE during DTX operation with late TPC commands. In this example, the TPC commands for the UE are sent on the F-DPCH near the end of each slot. The UE may thus apply the TPC command received on the F-DPCH in slot i+1 to the uplink transmission on the UL-DPCCH in the next slot i+2, as shown in FIG. 6.

At the start of the first transmission burst in FIG. 8A, the pilot sent on the UL-DPCCH in slot i is used to generate the TPC command sent on the F-DPCH in slot i+1. This TPC command is applied to the uplink transmission sent on the UL-DPCCH in slot i+2. The TPC commands sent on the F-DPCH in slots i+2 through i+4 are similarly applied to the uplink transmissions sent on the UL-DPCCH in slots i+3 through i+5, respectively. Since the UE does not transmit on the uplink in slots i+6 and i+7, the UE may save the two TPC commands received on the F-DPCH in slots i+5 and i+6.

In the design shown in FIG. 8A, the UE applies the two saved TPC commands consecutively in the first two slots when transmission resumes. In particular, the UE applies the TPC command received on the F-DPCH in slot i+5 to the uplink transmission sent on the UL-DPCCH in slot i+12. The UE applies the TPC command received on the F-DPCH in slot i+6 to the uplink transmission sent on the UL-DPCCH in slot i+13.

In another design, UE applies the TPC command received on the F-DPCH in slot i+6 to the uplink transmission sent on the UL-DPCCH in slot i+12. The UE applies the TPC command received on the F-DPCH in slot i+5 to the uplink transmission sent on the UL-DPCCH in slot i+13. This order is reversed from the order shown in FIG. 8A.

In yet another design, UE applies an UP TPC command (if any) received on the F-DPCH in slot i+5 or i+6 to the uplink transmission sent on the UL-DPCCH in slot i+12. The UE applies the other TPC command to the uplink transmission sent on the UL-DPCCH in slot i+13. This design allows the UE to increase its transmit power early in the next transmission burst, which may improve performance.

The UE may also apply the two saved TPC commands in the first two slots of the next transmission burst in other manners.

Figure 8B:
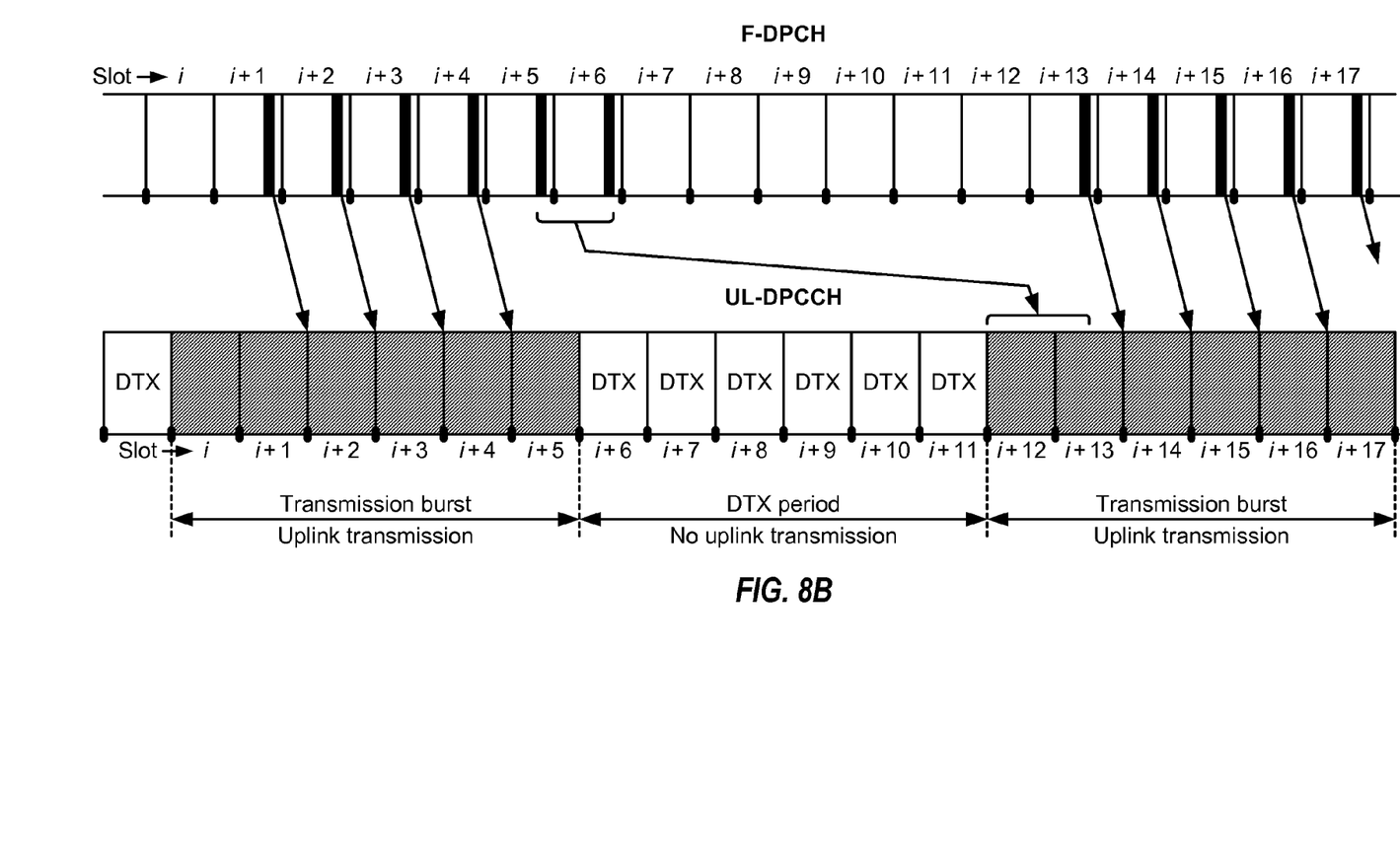

FIG. 8B shows another design of uplink power control for the UE during DTX operation with late TPC commands. In this example, the TPC commands for the UE are sent on the F-DPCH near the end of each slot, and the UE saves the last two TPC commands received on the F-DPCH in slots i+5 and i+6, as described above for FIG. 8A. In this design, the UE applies the two saved TPC commands in each of the first two slots of the next transmission burst. This may be achieved in various manners.

In one design, the UE accumulates the values of the two saved TPC commands to obtain a combined value. The UE may normally increase its transmit power by a predetermined amount $\Delta$ for an UP TPC command and may decrease its transmit power by the predetermined amount $\Delta$ for a DOWN TPC command. The UE may determine the combined value $\Delta_{combined}$ for the two saved TPC commands, as follows:

$$\Delta_{combined} = \begin{cases} +2\Delta & \text{if both saved } TPC \text{ commands are UP commands} \\ 0 & \text{if one saved } TPC \text{ command is an UP command and the other saved } TPC \text{ command is a DOWN command} \\ -2\Delta & \text{if both saved } TPC \text{ commands are DOWN commands} \end{cases} \quad \text{Eq (1)}$$

The UE may adjust its transmit power by the combined value $\Delta_{combined}$ in each of the first two slots i+12 and i+13 of the next transmission burst.

In another design, the UE first accumulates the values of the two saved TPC commands, as shown in equation (1). The UE then limits or caps the combined value, as follows:

$$\Delta_{capped} = \begin{cases} \Delta_{combined} & \text{if } -\Delta \leq \Delta_{combined} \leq +\Delta \\ +\Delta & \text{if } \Delta_{combined} > +\Delta \\ -\Delta & \text{if } \Delta_{combined} < -\Delta. \end{cases} \quad \text{Eq (2)}$$

The UE may adjust its transmit power by the capped value $\Delta_{capped}$ in each of the first two slots i+12 and i+13 of the next transmission burst.

In yet another design, the UE uses one of the two saved TPC commands when the other saved TPC command is dropped. A saved TPC command may be dropped based on various criteria, e.g., if a received value for the TPC command is below a detection threshold. The UE may adjust its transmit power based on the saved TPC command that is not dropped in each of the first two slots i+12 and i+13 of the next transmission burst.

In yet another design, the UE uses one of the two saved TPC commands. In one scheme, the UE may use the last saved TPC command (e.g., received in slot i+6) and may discard the earlier saved TPC command (e.g., received in slot i+5). In another scheme, the UE may use the saved TPC command that is more reliable (e.g., having a higher received value) and may discard the other saved TPC command. The UE may also select one saved TPC command based on other criteria. In any case, the UE may adjust its transmit power based on the selected TPC command in each of the first two slots i+12 and i+13 of the next transmission burst.

In yet another design, the UE may discard both saved TPC commands, e.g., if these TPC commands are deemed unreliable. The UE may apply the transmit power level used in slot i+5 for each of the first two slots i+12 and i+13 of the next transmission burst. The UE may thus resume transmission at the same power level as before the transmission gap.

The techniques described herein allow for use of one or more TPC commands that are valid since they are generated based on valid uplink SIR measurement at the Node B. Instead of discarding the last two TPC commands in a transmission burst, which may waste capacity, the techniques efficiently make use of these two TPC commands when transmission is resumed.

Figure 9:
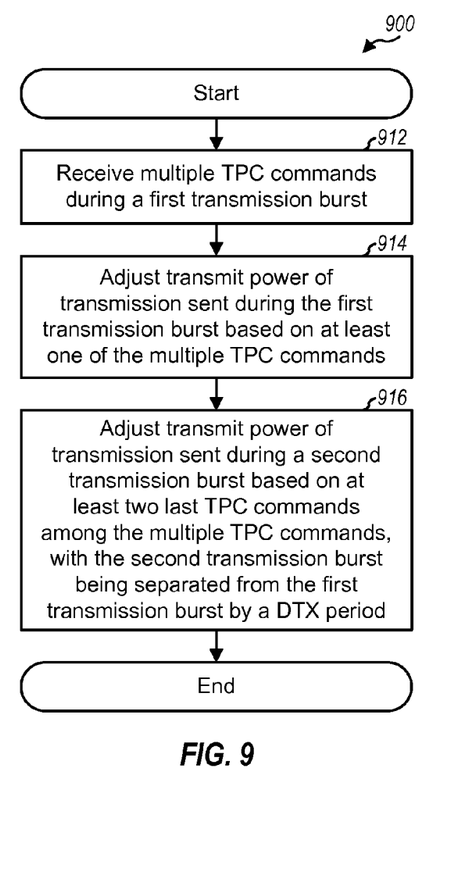
FIG. 9 shows a process performed by the UE for uplink power control.

FIG. 9 shows a design of a process 900 performed by the UE for uplink power control. The UE may receive multiple TPC commands during a first transmission burst (block 912). The UE may adjust transmit power of transmission sent during the first transmission burst based on at least one of the multiple TPC commands (block 914). The UE may adjust transmit power of transmission sent during a second transmission burst based on at least two last TPC commands among the multiple TPC commands (block 916). The second transmission burst may be separated from the first transmission burst by a DTX period. For block 916, the UE may adjust transmit power for the early portion of the second transmission burst based on the at least two last TPC commands received during the first transmission burst and may adjust transmit power for the remaining portion of the second transmission burst based on TPC commands received during the second transmission burst.

In one design of block 916, the UE may adjust transmit power for one of the first two slots (e.g., the first slot) of the second transmission burst based on one of the last two TPC commands (e.g., the second to last TPC command or an UP TPC command) received during the first transmission burst.

The UE may adjust transmit power for the other one of the first two slots (e.g., the second slot) of the second transmission burst based on the other one of the last two TPC commands (e.g., the last TPC command) received during the first transmission burst.

In another design of block 916, the UE may obtain a combined value based on the last two TPC commands received during the first transmission burst and may adjust transmit power for the first two slots of the second transmission burst based on the combined value. In yet another design, the UE may obtain a capped value by limiting the combined value to within a predetermined range and may adjust transmit power for the first two slots of the second transmission burst based on the capped value.

In yet another design, the UE may select one of the last two TPC commands received during the first transmission burst and may adjust transmit power for at least one slot of the second transmission burst based on the selected TPC command. In yet another design, the UE may select the most reliable TPC command among the last two TPC commands received during the first transmission burst and may adjust transmit power for at least one slot of the second transmission burst based on the selected TPC command. In yet another design, the UE may select the last TPC command received during the first transmission burst and may adjust transmit power for the first two slots of the second transmission burst based on the last TPC command. The UE may also adjust transmit power for the second transmission burst based on the at least two last TPC commands received during the first transmission burst in other manners.

The UE may receive the multiple TPC commands on the F-DPCH and may send transmission on the UL-DPCCH during the first and second transmission bursts. The UE may also receive the TPC commands on other downlink channels and may send transmission on other uplink channels. The UE may receive the multiple TPC commands in multiple slots at one of multiple possible time offsets. The UE may adjust transmit power during the second transmission burst based on the last two TPC commands if received within a first range of time offsets (e.g., within area 614 in FIG. 6) and may adjust transmit power during the second transmission burst based on the last TPC command if received within a second range of time offsets (e.g., within area 612 in FIG. 6).

The Node B may also perform process 900 for downlink power control to adjust the transmit power of downlink transmission sent to the UE.

Figure 10:
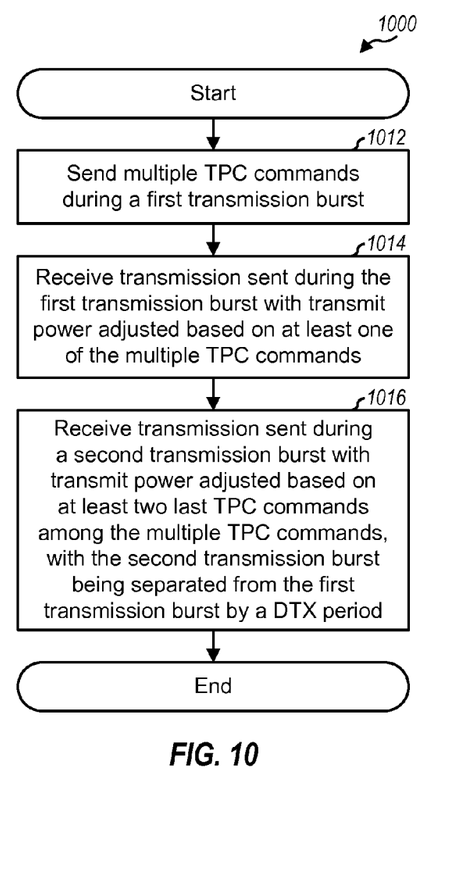
FIG. 10 shows a process performed by the Node B for uplink power control.

FIG. 10 shows a design of a process 1000 performed by the Node B for uplink power control. The Node B may send multiple TPC commands during a first transmission burst (block 1012). The Node B may receive transmission sent during the first transmission burst with transmit power adjusted based on at least one of the multiple TPC commands (block 1014). The Node B may receive transmission sent during a second transmission burst with transmit power adjusted based on at least two last TPC commands among the multiple TPC commands (block 1016). The second transmission burst may be separated from the first transmission burst by a DTX period. The Node B may estimate SIR based on the transmission received during the first transmission burst and may generate the multiple TPC commands based on the estimated SIR.

Figure 11:
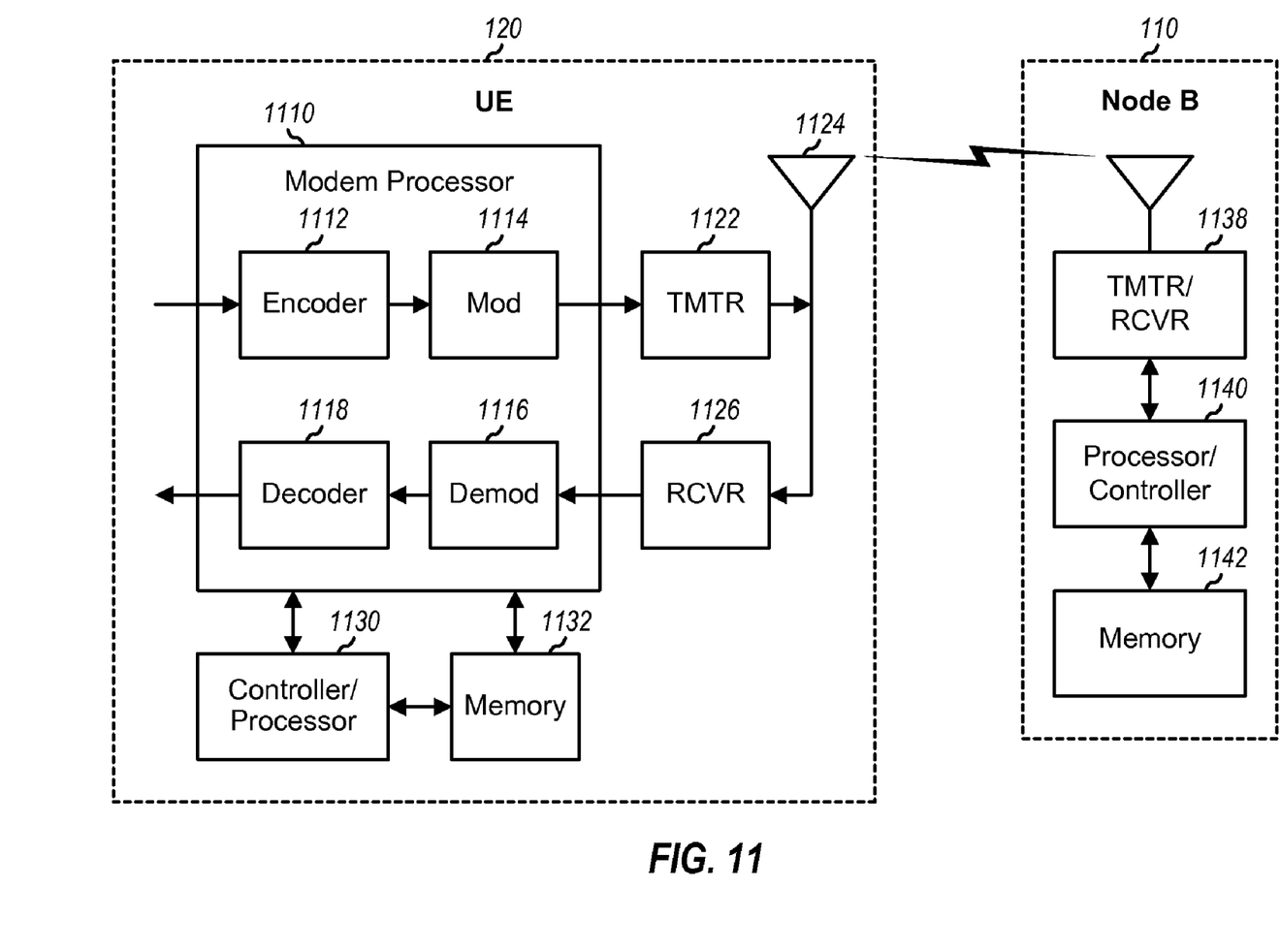
FIG. 11 shows a block diagram of the UE and the Node B.

FIG. 11 shows a block diagram of a design of UE 120, which may be one of the UEs in FIG. 1. On the uplink, an encoder 1112 may receive data and signaling to be sent by UE 120 on the uplink. Encoder 1112 may process (e.g., format, encode, and interleave) the data and signaling. A modulator (Mod) 1114 may further process (e.g., modulate, channelize, and scramble) the encoded data and signaling and provide output chips. A transmitter (TMTR) 1122 may condition (e.g., convert to analog, filter, amplify, and frequency upconvert) the output chips and generate an uplink signal, which may be transmitted via an antenna 1124 to Node B 110.

On the downlink, antenna 1124 may receive downlink signals transmitted by Node B 110 and other Node Bs. A receiver (RCVR) 1126 may condition (e.g., filter, amplify, frequency downconvert, and digitize) the received signal from antenna 1124 and provide samples. A demodulator (Demod) 1116 may process (e.g., descramble, channelize, and demodulate) the samples and provide symbol estimates. A decoder 1118 may further process (e.g., deinterleave and decode) the symbol estimates and provide decoded data and signaling. The downlink signaling may comprise TPC commands, etc. Encoder 1112, modulator 1114, demodulator 1116, and decoder 1118 may be implemented by a modem processor 1110. These units may perform processing in accordance with the radio technology (e.g., W-CDMA, GSM, etc.) used by the system.

A controller/processor 1130 may direct the operation of various units at UE 120. Controller/processor 1130 may implement process 900 in FIG. 9 and/or other processes for the techniques described herein. Memory 1132 may store program codes and data for UE 120.

FIG. 11 also shows a block diagram of Node B 110, which may be one of the Node Bs in FIG. 1. Within Node B 110, a transmitter/receiver 1138 may support radio communication with UE 120 and other UEs. A processor/controller 1140 may perform various functions for communication with the UEs and may perform process 1000 in FIG. 10 and/or other processes for the techniques described herein. Memory 1142 may store program codes and data for Node B 110.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
at least one processor configured to receive multiple transmit power control (TPC) commands during a first transmission burst, to adjust transmit power of transmission sent during the first transmission burst based on at least one of the multiple TPC commands, and to adjust transmit power of transmission sent during a second transmission burst based on at least two last TPC commands among the multiple TPC commands, the second transmission burst being separated from the first transmission burst by a discontinuous transmission (DTX) period; and
a memory coupled to the at least one processor.

2. The apparatus of claim 1, wherein the at least one processor is configured to adjust transmit power of transmission sent during an early portion of the second transmission burst based on the at least two last TPC commands received during the first transmission burst, and to adjust transmit power of transmission sent during remaining portion of the second transmission burst based on TPC commands received during the second transmission burst.

3. The apparatus of claim 1, wherein the at least one processor is configured to adjust transmit power of transmission sent in one of first two slots of the second transmission burst based on one of last two TPC commands received during the first transmission burst, and to adjust transmit power of transmission sent in other one of the first two slots of the second transmission burst based on other one of the last two TPC commands received during the first transmission burst.

4. The apparatus of claim 1, wherein the at least one processor is configured to adjust transmit power of transmission sent in a first slot of the second transmission burst based on a second to last TPC command received during the first transmission burst, and to adjust transmit power of transmission sent in a second slot of the second transmission burst based on a last TPC command received during the first transmission burst.

5. The apparatus of claim 1, wherein the at least one processor is configured to adjust transmit power of transmission sent in a first slot of the second transmission burst based on an UP TPC command, if any, among last two TPC commands received during the first transmission burst, and to adjust transmit power of transmission sent in a second slot of the second transmission burst based on other one of the last two TPC commands received during the first transmission burst.

6. The apparatus of claim 1, wherein the at least one processor is configured to obtain a combined value based on last two TPC commands received during the first transmission burst, and to adjust transmit power of transmission sent in first two slots of the second transmission burst based on the combined value.

7. The apparatus of claim 1, wherein the at least one processor is configured to obtain a combined value based on last two TPC commands received during the first transmission burst, to limit the combined value to within a predetermined range to obtain a capped value, and to adjust transmit power of transmission sent in first two slots of the second transmission burst based on the capped value.

8. The apparatus of claim 1, wherein the at least one processor is configured to select one of the at least two last TPC commands received during the first transmission burst, and to adjust transmit power of transmission sent in at least one slot of the second transmission burst based on the selected TPC command.

9. The apparatus of claim 1, wherein the at least one processor is configured to select a most reliable TPC command among the at least two last TPC commands received during the first transmission burst, and to adjust transmit power of transmission sent in at least one slot of the second transmission burst based on the selected TPC command.

10. The apparatus of claim 1, wherein the at least one processor is configured to select last TPC command received during the first transmission burst, and to adjust transmit power of transmission sent in first two slots of the second transmission burst based on the last TPC command.

11. The apparatus of claim 1, wherein the at least one processor is configured to receive the multiple TPC commands in multiple slots at one of multiple possible time offsets.

12. The apparatus of claim 11, wherein the at least one processor is configured to adjust transmit power of transmission sent during the second transmission burst based on two last TPC commands if received within a first range of time offsets, and to adjust transmit power of transmission sent during the second transmission burst based on last TPC command if received within a second range of time offsets.

13. The apparatus of claim 1, wherein the at least one processor is configured to receive the multiple TPC commands on a Fractional Dedicated Physical Channel (F-DPCH), and to send transmission on an uplink Dedicated Physical Control Channel (UL-DPCCH) during the first and second transmission bursts.

14. A method for wireless communication, comprising:
receiving multiple transmit power control (TPC) commands during a first transmission burst;
adjusting transmit power of transmission sent during the first transmission burst based on at least one of the multiple TPC commands; and
adjusting transmit power of transmission sent during a second transmission burst based on at least two last TPC commands among the multiple TPC commands, the second transmission burst being separated from the first transmission burst by a discontinuous transmission (DTX) period.

15. The method of claim 14, wherein the adjusting transmit power of transmission sent during the second transmission comprises
adjusting transmit power of transmission sent in one of first two slots of the second transmission burst based on one of last two TPC commands received during the first transmission burst, and
adjusting transmit power of transmission sent in other one of the first two slots of the second transmission burst based on other one of the last two TPC commands received during the first transmission burst.

16. The method of claim 14, wherein the adjusting transmit power of transmission sent during the second transmission comprises
obtaining a combined value based on last two TPC commands received during the first transmission burst, and
adjusting transmit power of transmission sent in first two slots of the second transmission burst based on the combined value.

17. The method of claim 14, wherein the adjusting transmit power of transmission sent during the second transmission comprises
selecting one of the at least two last TPC commands received during the first transmission burst, and
adjusting transmit power of transmission sent in at least one slot of the second transmission burst based on the selected TPC command.

18. The method of claim 14, wherein the receiving the multiple TPC commands comprises receiving the multiple TPC commands on a Fractional Dedicated Physical Channel (F-DPCH), and wherein the method further comprises:
sending transmission on an uplink Dedicated Physical Control Channel (UL-DPCCH) during the first and second transmission bursts.

19. An apparatus for wireless communication, comprising:
means for receiving multiple transmit power control (TPC) commands during a first transmission burst;
means for adjusting transmit power of transmission sent during the first transmission burst based on at least one of the multiple TPC commands; and
means for adjusting transmit power of transmission sent during a second transmission burst based on at least two last TPC commands among the multiple TPC commands, the second transmission burst being separated from the first transmission burst by a discontinuous transmission (DTX) period.

20. The apparatus of claim 19, wherein the means for adjusting transmit power of transmission sent during the second transmission comprises
means for adjusting transmit power of transmission sent in one of first two slots of the second transmission burst based on one of last two TPC commands received during the first transmission burst, and
means for adjusting transmit power of transmission sent in other one of the first two slots of the second transmission burst based on other one of the last two TPC commands received during the first transmission burst.

21. The apparatus of claim 19, wherein the means for adjusting transmit power of transmission sent during the second transmission comprises
means for obtaining a combined value based on last two TPC commands received during the first transmission burst, and
means for adjusting transmit power of transmission sent in first two slots of the second transmission burst based on the combined value.

22. The apparatus of claim 19, wherein the means for adjusting transmit power of transmission sent during the second transmission comprises
means for selecting one of the at least two last TPC commands received during the first transmission burst, and
means for adjusting transmit power of transmission sent in at least one slot of the second transmission burst based on the selected TPC command.

23. The apparatus of claim 19, wherein the means for receiving the multiple TPC commands comprises means for receiving the multiple TPC commands on a Fractional Dedicated Physical Channel (F-DPCH), and wherein the apparatus further comprises:
means for sending transmission on an uplink Dedicated Physical Control Channel (UL-DPCCH) during the first and second transmission bursts.

24. A computer readable storage medium storing:
code for causing at least one computer to receive multiple transmit power control (TPC) commands during a first transmission burst;
code for causing the at least one computer to adjust transmit power of transmission sent during the first transmission burst based on at least one of the multiple TPC commands;
code for causing the at least one computer to adjust transmit power of transmission sent during a second transmission burst based on at least two last TPC commands among the multiple TPC commands, the second transmission burst being separated from the first transmission burst by a discontinuous transmission (DTX) period.

25. Computer readable storage medium of claim 24 further comprising:
- code for causing the at least one computer to adjust transmit power of transmission sent in one of first two slots of the second transmission burst based on one of last two TPC commands received during the first transmission burst; and
- code for causing the at least one computer to adjust transmit power of transmission sent in other one of the first two slots of the second transmission burst based on other one of the last two TPC commands received during the first transmission burst.

26. Computer readable storage medium of claim 24 further comprising:
- code for causing the at least one computer to obtain a combined value based on last two TPC commands received during the first transmission burst; and
- code for causing the at least one computer to adjust transmit power of transmission sent in first two slots of the second transmission burst based on the combined value.

27. Computer readable storage medium of claim 24 further comprising:
- code for causing the at least one computer to select one of the at least two last TPC commands received during the first transmission burst; and
- code for causing the at least one computer to adjust transmit power of transmission sent in at least one slot of the second transmission burst based on the selected TPC command.

28. Computer readable storage medium of claim 24 further comprising:
- code for causing the at least one computer to receive the multiple TPC commands on a Fractional Dedicated Physical Channel (F-DPCH); and
- code for causing the at least one computer to send transmission on an uplink Dedicated Physical Control Channel (UL-DPCCH) during the first and second transmission bursts.

29. An apparatus for wireless communication, comprising:
- at least one processor configured to send multiple transmit power control (TPC) commands during a first transmission burst, to receive transmission sent during the first transmission burst with transmit power adjusted based on at least one of the multiple TPC commands, and to receive transmission sent during a second transmission burst with transmit power adjusted based on at least two last TPC commands among the multiple TPC commands, the second transmission burst being separated from the first transmission burst by a discontinuous transmission (DTX) period; and
- a memory coupled to the at least one processor.

30. The apparatus of claim 29, wherein the at least one processor is configured to estimate signal-to-noise-and-interference ratio (SIR) based on the transmission received during the first transmission burst, and to generate the multiple TPC commands based on the estimated SIR.

31. A method for wireless communication, comprising:
- sending multiple transmit power control (TPC) commands during a first transmission burst;
- receiving transmission sent during the first transmission burst with transmit power adjusted based on at least one of the multiple TPC commands; and
- receiving transmission sent during a second transmission burst with transmit power adjusted based on at least two last TPC commands among the multiple TPC commands, the second transmission burst being separated from the first transmission burst by a discontinuous transmission (DTX) period.

32. The method of claim 31, further comprising:
- estimating signal-to-noise-and-interference ratio (SIR) based on the transmission received during the first transmission burst; and
- generating the multiple TPC commands based on the estimated SIR.

* * * * *